Feb. 19, 1952 E. W. BURKE, JR 2,586,609

POINT-CONTACT ELECTRICAL DEVICE

Filed May 27, 1950

INVENTOR
EDWARD W. BURKE, JR.
BY Paul S. Martin
ATTORNEY

Patented Feb. 19, 1952 2,586,609

UNITED STATES PATENT OFFICE 2,586,609

POINT-CONTACT ELECTRICAL DEVICE

Edward W. Burke, Jr., Flushing, N. Y., assignor to Sylvania Electric Products Inc., a corporation of Massachusetts Application May 27, 1950, Serial No. 164,836

9 Claims. (Cl. 201—64)

Figure 1:
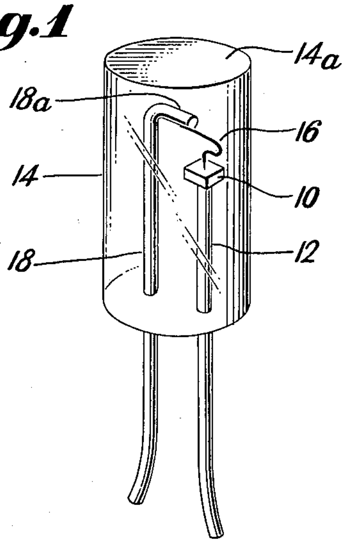

The present invention relates to so-called point-contact electrical translators, including diodes used for rectification and for photo detection, and like point-contact semiconductor devices, and to a method of constructing such devices.

The development of point-contact electrical translators extends back many decades. Since the early years of this development, diodes used for rectification in detecting radio signals have included a body of semiconductor material engaged by a point-contact element or whisker. An improved detector is disclosed in copending application Serial No. 492,163, filed June 23, 1943, by Ezio T. Casellini, now Patent No. 2,572,801, issued October 23, 1951, including a carefully processed silicon or germanium body engaged by a tungsten wire having a ground conical point. Certain semiconductor rectifiers have also been noted for their photo-conductivity, that is, for the change in resistivity when exposed to light as contrasted with the resistivity in darkness under constant electrical conditions.

In recent years point-contact diodes have commonly been formed of a rigid cartridge with leads that extend from opposite ends of the cartridge, carrying the whisker and the semiconductor body in mutual contact inside the cartridge. These containers have been formed of ceramic or other rigid insulating material, with metal fittings at the ends where the leads are received. Mechanical shock might cause shifting of the point-contact element away from the original contact region where its characteristics were proper, and to prevent this the cartridge has heretofore been filled with powdered Alundum, non-hardening wax, or the like. The fill also is intended to inhibit atmospheric deterioration of the material in the region of the contact.

The use of plastics, whether thermo-setting or thermo-plastic, has for long seemed attractive as a substitute for the relatively expensive multi-part cartridge and its protective fill. Difficulties have been encountered in making satisfactory plastic-encased rectifiers of this type. Plastics have a thermal coefficient of expansion that is roughly ten times that of metals used for leads. When it was attempted to embed the leads, the whisker and the semiconductor in a plastic in their usual arrangement, open-circuiting would frequently result, due in all probability to the unequal thermal coefficients. This may be understood when it is realized that the plastic tends to pull the leads apart when the temperature rises, and when the temperature diminishes below that at which the unit was assembled the point-contact element becomes mashed against the semiconductor surface, or in the alternative the semiconductor may become damaged, with the result that the subsequent increase in ambient temperature tends to separate the contact element and the semiconductor body.

The foregoing difficulty is somewhat obviated by taking advantage of the resilience of the contact element, by forming the cartridge of a plastic tube with plugs carrying the whisker lead and the semiconductor lead at opposite ends of the tube. This construction, involving the assembling of plugs and the plastic tube to complete the container, leaves the restricted volume about the contact whisker unfilled. A range of thermal expansion and contraction of the plastic tube tends to disturb the semiconductor characteristic because, perhaps, of its pressure-sensitivity; and there remains some tendency to produce the open circuit condition due to the thermal coefficient differences, and due to inadequate protection of the contact region against atmospheric attack.

The present invention provides a stable construction of point-contact translators integrally enclosed in suitable plastic. In accomplishing this purpose in the illustrative embodiments described below, the leads which carry the semiconductor body and the whisker or point-contact element (and any additional point-contact element that may be desired) are arranged generally parallel and close to each other with the whisker and the semiconductor body near adjacent ends of the leads and the opposite ends of the leads emerging close together from a single end of the plastic unit. In this single-ended construction it has been found that temperature changes over a substantial range do not destroy the delicate contact initially established. In theory, any tendency of the plastic to move the whisker is accompanied by a like tendency to carry the semiconductor body with it, and this coordinate effect evidently defeats any tendency that might exist for disturbing the initial adjustment. By enclosing a substantial length of the leads in the plastic material, the leads emerging from the plastic can be stressed substantially without deforming the assembly in the point-contact region. In the double-ended construction, if an attempt were made to limit the length of plastic about the leads to so short a dimension as to avoid an excessive absolute net value of the unequal metal and plastic expansions, the plastic might not afford sufficient resistance to mechanical stresses imposed on the leads.

In making the preferred embodiments, the assembled semiconductor, whisker and leads are best immersed and cast in a suitable polymer, although other procedures may be found suitable.

Figure 2:
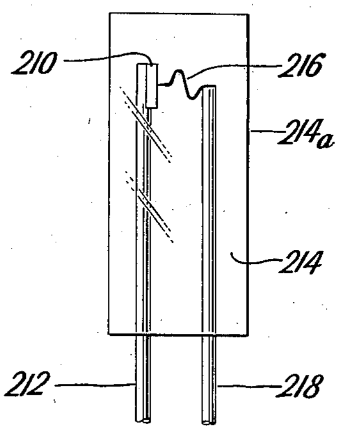
Figure 3:
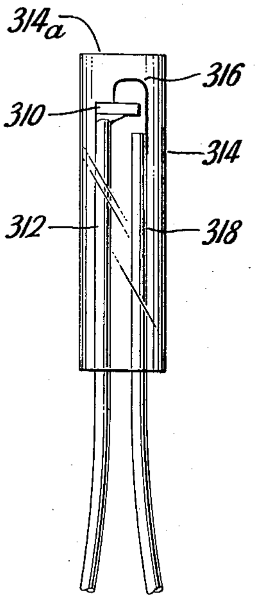
Figure 4:
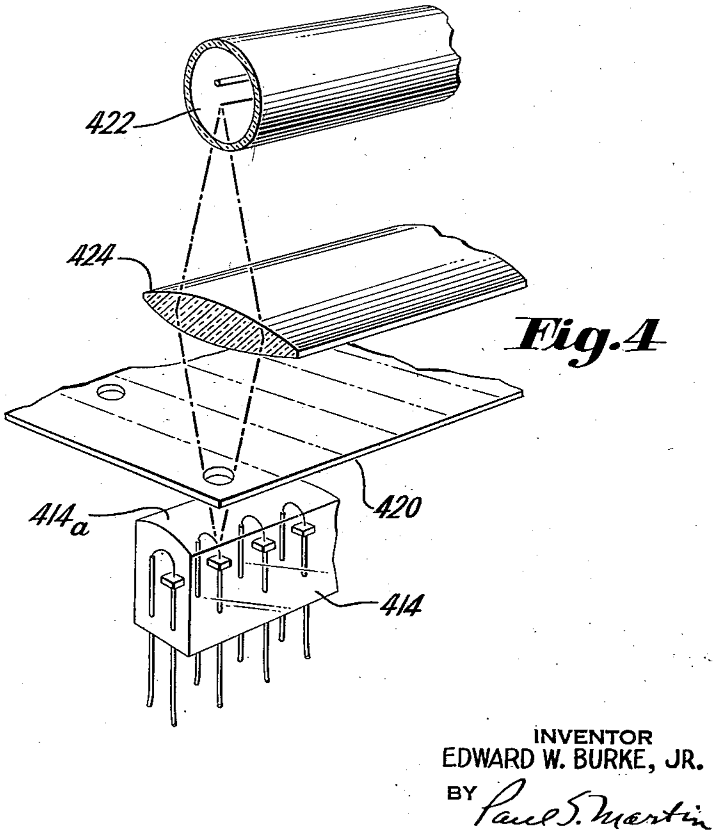

The nature of the invention will be better appreciated from the following detailed description of four illustrative embodiments thereof shown substantially enlarged in the accompanying drawings. Figs. 1 and 4 are perspective views, whereas Figs. 2 and 3 are lateral views of the four embodiments; and in Fig. 4 additional apparatus is shown, partly in section.

In Fig. 1, a diode including a chip 10 of polished and etched crystalline germanium containing a conventional fractional percentage of tin is soldered transversely on the end of a lead 12 having a substantial length embedded in a body 14 of transparent plastic. This may for example be a low-temperature polymerizing methyl methacrylate, or it may be a styrene analogue or a wide variety of other suitable substances. Methyl methacrylate is transparent to visible and infrared radiation and is thus suitable where the device is to be used as a photo-detector. A whisker 16 having a prepared point and formed as of tungsten is in contact with semiconductor 10, whisker 16 being welded to a lead 18 that extends parallel to lead 12 and emerges from the same end of body 14 as does lead 12. The resilient nature of the whisker would seem to be largely lost after it has been embedded in the plastic. This whisker and the semiconductor body 10 are locked in the plastic in proper mutual contact initially established, and with the single-ended construction the resilience does not appear to be required after the unit is completed. The desired characteristics are preserved despite reasonable latitudes of expansion and contraction of the plastic 14 relative to leads 12 and 18. Semiconductor body 10 is keyed to the portion of the plastic that encases it because of its greater extent transversely of the supporting lead and whisker 16 with the hooked portion 18*a* of lead 18 is also keyed to the plastic at the end of body 14 where the point-contact region is established. A strong bond and air-tight seal also exists between the plastic and the leads. The separation between the leads is held to a minimum to avoid consequences inherent in the double-ended construction.

Lead 12 may be of copper and lead 18 may be of nickel. When these materials are used the germanium 10 can conveniently be soldered to lead 12, whereas a tungsten whisker 16 can readily be welded to nickel portion 18*a*. The contrasting metals also facilitate distinguishing between the external leads.

The point-contact on body 10 engages the semiconductor surface that is transverse of body 14 so that radiation perpendicularly incident on the end 14*a* of plastic body 14 will reach the contact region, and will be effective to modify the resistance of the device. For this purpose it is desirable for the surface 14*a* to be optically figured so as to be reasonably flat, this optical figuring being desirable to avoid disturbing any focused radiation directed toward body 10.

A modification of the construction in Fig. 1 is shown in Fig. 2 in which numerals of the 200 series are used that correspond to the parts in Fig. 1. In Fig. 2, however, the surface of the semiconductor body 210 is parallel to its supporting lead 211, and the point-contact element 216 extends generally transverse of its supporting lead 218. In this embodiment the lateral surface 214*a* should be optically figured where the device is to be used for its photoelectric properties, and in this instance, too, the plastic chosen should be transparent to the radiation. The semiconductor is of greater transverse extent than the supporting lead and is thus firmly keyed in place in the plastic.

In Fig. 3, a substantially more compact photo diode is shown having parts designaed by numerals of the 300 series corresponding to the elements of Figs. 1 and 2. The cross-sectional extent of the unit in Fig. 3 is reduced to a minimum and a large number of these can be assembled very close together. When the cross-sectional extent of the plastic body is reduced to a value that is only a few times the combined cross-sectional extents of the leads, the embedded point-contact element and semiconductor body may owe superior stability to an added factor, as follows: while the plastic tends to expand and contract to a much greater extent that the metal leads during thermal changes, the plastic is more compressible and considering the strong bond between the metal and plastic, the metal can constrain the plastic to substantially coordinate longitudinal changes with the metal. The plastic may be stressed, but here it is constrained to move with the metal, whereas in the double-ended construction it would shrink or expand freely in the contact region.

The body 310 of semiconductor, or chip or dice as the body is otherwise commonly called, is not conveniently made in sizes smaller than 1/8th inch, formed in squares by a series of parallel cuts intersecting with other parallel cuts made with a diamond wheel through a thin slice taken from an ingot. These chips are ground smaller, where necessary, to .030 inch for example. The transverse dimension of body 314 is seen to be not much larger than the chip. Lead 312 is longer than lead 318, measured within body 314, and this lead 312 has its embedded end closer to surface 314*a*. Chip 310, soldered to the upper end of longer lead 312, extends across the embedded end of lead 318. The point-contact element 316, welded to the embedded end of lead 318, is of J-shape so as to extend across the edge of chip 310 and loop reversely into point-contact with the surface of body 310 that is exposed to the surface 314*a* where radiation is to be directed.

In all three instances, Figs. 1–3, the space about the fine wire that establishes point-contact with the semi-conductor element and about semiconductor element itself is filled to exclude deleterious atmosphere; and these elements are embedded in the plastic body near one end and the leads emerge from the opposite end. The separation between the leads is a small fraction of the embedded lengths of the leads and the surface of the leads is sealed to the plastic. A separation between the leads is held to a minimum and should not exceed approximately 1/8th inch lest the same difficulties might arise as would be encountered with double-ended sealed-in-plastic units where the point-contact element and the crystal are in engagement between leads that extend in opposite directions from the point-contact region.

The methyl methacrylate polymer used in the illustrative embodiments has a thermal coefficient of approximately $8\times10^{-5}$ cm./cm./°C.; the nickel lead has a thermal coefficient of about $13\times10^{-6}$ cm./cm./°C.; and the copper lead has a thermal coefficient of about $16\times10^{-6}$ cm./cm./°C. A 25% reduction in the thermal coefficient of the methyl methacrylate used can be realized by incorporating powdered glass in the methyl methacrylate.

The various embodiments in Figs. 1–3 have by way of illustration and axial length of 0.3 to 0.4 inch. The unit in Fig. 1 has been made with a spacing of the leads of .06 inch on centers and the lead spacing of the unit in Fig. 3 has been 0.030 inch on centers. The diameters of the units in Figs. 1 and 3 have been 0.2 inch and 0.08 inch respectively, leads of 0.02 inch diameter, and the whiskers 0.005 inch diameter. The foregoing dimensions are, of course, illustrative, but indicate the desirable proportions and magnitudes involved.

In making rectifying diodes or photo diodes (and this would apply also to translators having more than two contacts) the leads carrying the semiconductor and the whisker are adjustably but firmly supported in a jig. The leads are shifted axially in the jig until proper mutual contact is established as determined by concurrent electrical testing. To enable such test to be performed the jig should be either wholly of insulating material or should be of insulated lead-engaging sections. Where the semiconductor bodies are of germanium the insulated jig is desirable for the further purpose of enabling application of pulsing electrical energy that enhances the diode rectification characteristic.

After the unit is completed electrically it is immersed in a suitable plastic or otherwise arranged for casting or molding in plastic, care being taken to avoid disturbing the components mechanically. A low temperature polymerizing methyl methacrylate has been found excellent for this purpose. The jig is simply supported above a cavity that is filled with the plastic to immerse the leads sufficiently, and held in place until polymerization has proceeded to solidification. Each jig can be arranged to carry many diode units, supported within a like number of cavities.

Multiple units can be incorporated in a strip form of multiple translator shown in Fig. 4. Such unit is useful for example where the photo diode elements are spaced apart so as to be in alignment with the columns of a perforated record 420. This record is positioned and fed by well-known mechanisms so that light from a long and slender source 422 parallel to body 414 can be focused by lens 424 on the photo diode elements. Light passing through the record perforations greatly changes the resistivity (and produces a smaller photo-voltaic effect) that is to be translated in the same way that electrical pulses are ordinarily utilized in perforated record machines. The upper surface 414a is advantageously optically figured as a cylindrical lens for further promoting the focusing of the incident radiation on the immediate area surrounding the point-contact element. It will be evident that the surfaces 114a, 214a, and 314a can be curved, as spherically, where focusing is to be accomplished; and the plastic can be opaque where rectification rather than photo detection is to be effected.

Further detailed modifications and applications will occur to those skilled in the art and therefore the appended claims should be accorded the broad interpretation that is consistent with the spirit and scope of the invention.

What I claim is:

1. A semiconductor device including a body of transparent methyl methacrylate, a pair of substantially parallel leads extending from one surface of said body in the same direction and having adjacent ends embedded in said body near the opposite surface thereof, a photosensitive semiconductor body secured to the embedded end of one of said leads, said semiconductor body having greater transverse extent than its supporting lead, and a comparatively slender point-contact element extending from the embedded end of the other of said leads and into engagement with the surface of said semiconductor body nearest said opposite surface of said plastic body, said opposite surfaces of said plastic body being optically figured for transmission of focused radiation to the immediate vicinity of the point-contact area of said semiconductor.

2. An electrical device including a transparent solidified plastic body, a pair of substantially parallel leads having adjacent ends embedded near one surface of the plastic body and extending through said body to emerge close together from an opposite surface thereof, one of said leads being longer than the other to extend closer to said one surface, a piece of photosensitive semiconductor material secured to the embedded end of said longer lead and having a greater transverse extent than its supporting lead, said piece of semiconductor having its exposed surface opposite said one end of the plastic body, and a J-shaped wire secured to the embedded end of the shorter one of said leads and extending around an edge of said semiconductor body and into point-contact with said exposed surface thereof.

3. A semiconductor device including a pair of substantially parallel leads having adjacent ends embedded near one end of a comparatively long and slender body of solidified plastic with the opposite ends of said leads emerging from said plastic body at the opposite end thereof, a resilient point-contact element secured to the embedded end of one of said leads and in engagement with a semiconductor body on the embedded end of the other of said leads, said point-contact element and said semiconductor body being embedded in the plastic and having greater transverse extent than the cross-section of the supporting leads so as to be keyed to the plastic, the embedded length of said leads being several times as great as the separation between said leads.

4. A semiconductor device including a pair of substantially parallel leads, a body of plastic sealed to said leads and embedding adjacent ends thereof at a spacing not greater than ⅛th inch, and the opposite ends of said leads emerging from the plastic body with like spacing, one of said embedded lead ends carrying a semiconductor element and the other of said lead ends carrying a contact element engaging said semiconductor element, said elements being embedded in said plastic and engaging each other in substantially point-contact.

5. A semiconductor device including a semiconductor element and a point-contact element engaging the semiconductor element and embedded in a body of solidified polymer, said semiconductor body and its contact being joined to respective spaced leads bonded to the polymer and extending close together through the polymer to closely adjacent points of emergence.

6. An electrical device including a semiconductor element and a contact element engaging the semiconductor element, and a pair of leads joined to said elements respectively and extending substantially in the same direction from said elements, and a unitary insulating body embedding and sealed about said elements and bonded to said leads.

7. The method of making an electrical device including the steps of temporarily supporting a contact element in proper contact with a semi-conductor body with leads extending at close spacing from the contact region, immersing the assembly in an insulating fluid, and causing the fluid to solidify and retain the contacting elements in initial condition.

8. A semi-conductor device including a semi-conductor element, a point-contact element engaging said semi-conductor element, parallel leads extending from said elements, said elements and a substantial length of said leads being embedded in a plastic having a thermal coefficient substantially different from the thermal coefficient of said leads, the separation between said leads being a small fraction of the embedded lengths of the leads.

9. A semi-conductor device including a semi-conductor element, a lead of smaller transverse extent than said semi-conductor element secured thereto so that said element has a projecting portion, a second lead extending closely along said first mentioned lead and having one end below said projecting portion, a contact element extending from said one end of said second lead around said projecting portion and reversely into engagement with said semi-conductor element, and a plastic embedding said elements and a substantial length of said leads.

EDWARD W. BURKE, Jr.

REFERENCES CITED

The following references are of record in the file of this patent:

UNITED STATES PATENTS

| Number | Name | Date |
|---|---|---|
| 2,423,476 | Billings et al. | July 8, 1947 |
| 2,504,628 | Benzer | Apr. 18, 1950 |

FOREIGN PATENTS

| Number | Country | Date |
|---|---|---|
| 796,138 | France | Mar. 30, 1935 |